(12) United States Patent
Wilbrink et al.

(10) Patent No.: US 6,977,643 B2
(45) Date of Patent: Dec. 20, 2005

(54) SYSTEM AND METHOD IMPLEMENTING NON-PHYSICAL POINTERS FOR COMPUTER DEVICES

(75) Inventors: Tijs Wilbrink, Leiden (NL); Edward E. Kelley, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 328 days.

(21) Appl. No.: 10/227,359

(22) Filed: Aug. 22, 2002

(65) Prior Publication Data

US 2003/0128188 A1 Jul. 10, 2003

Related U.S. Application Data

(63) Continuation-in-part of application No. 10/045,484, filed on Jan. 10, 2002.

(51) Int. Cl.[7] .................................................. G09G 5/00
(52) U.S. Cl. ........................ 345/156; 345/168; 715/773
(58) Field of Search ................................ 345/156, 173, 345/168; 715/773, 799

(56) References Cited

U.S. PATENT DOCUMENTS

| 5,448,263 A | * | 9/1995 | Martin ......................... 345/173 |
| 6,108,200 A | | 8/2000 | Fullerton |
| 6,111,527 A | | 8/2000 | Susel |
| 6,128,014 A | * | 10/2000 | Nakagawa et al. ......... 715/784 |
| 6,266,048 B1 | | 7/2001 | Carau, Sr. |
| 6,614,422 B1 | * | 9/2003 | Rafii et al. ................... 345/168 |
| 6,741,267 B1 | * | 5/2004 | Leperen ....................... 715/773 |
| 6,747,636 B2 | * | 6/2004 | Martin ......................... 345/178 |

FOREIGN PATENT DOCUMENTS

| JP | 2094863 | 4/1990 |
| JP | 11-295813 | 10/1999 |
| PL | 178077 | 8/1995 |
| WO | WO 00/07357 | 2/2000 |
| WO | WO 00/21024 | 4/2000 |
| WO | WO 01/93006 A1 | 12/2001 |
| WO | WO 01/93182 A1 | 12/2001 |

OTHER PUBLICATIONS

Langerak, Door Henk, "Typen zonder toetsen," pp. 1–2, http://www.as.nl.artikelen/InternetenPc/1007014756653.html, last updated Nov. 30, 2001.

"The Acceleration Sensing Glove," http://bsac.eecs.berkeley.edu/~shollar/fingeracc.html, pp. 1–3, last updated Oct. 29, 2001.

* cited by examiner

*Primary Examiner*—Ricardo Osorio
(74) *Attorney, Agent, or Firm*—Scully, Scott, Murphy & Presser; Jay H. Anderson, Esq.

(57) ABSTRACT

A system and method for providing input to a handheld computing device by provisioning the handheld computing device with a device for projecting images generated as a result of applications executing on the computer device on a surface in front of a user located proximate said device, a projected image including an active screen display corresponding to an application executing in the device. A further projected image includes an object image located within the active screen display and representing a pointer to locations within the projected active screen display. The system detects the presence of an object located at the surface and within a projected image display area, and converts detected movement of the object located within a projected image display area on the surface into movement of the object image within the projected active screen display. The user is thus able to initiate a data input operation or execute a function at a location in the active screen display for the executing application.

28 Claims, 7 Drawing Sheets

SYSTEM AND METHOD IMPLEMENTING NON-PHYSICAL POINTERS FOR COMPUTER DEVICES

CROSS-REFERENCE TO RELATED APPLICATION

This application is a continuation-in-part application based upon and claiming the benefit of the filing of commonly-owned, co-pending U.S. patent application Ser. No. 10/045,484 filed Jan. 10, 2002 entitled "USER INPUT METHOD AND APPARATUS FOR HANDHELD COMPUTERS," the contents and disclosure of which are fully incorporated herein by reference.

BACKGROUND OF THE INVENTION

1. Field of the Invention

The present invention generally relates to the field of user input devices for computers, and more particularly, to a user input system and methodology for detecting user input using electromagnetic, optical or acoustic signals.

2. Description of the Prior Art

In recent years, the size of portable computers have significantly decreased from the original laptop design, to the handheld and sub-notebook computers. Hand-held computers and sub-notebook computers are smaller computers with a laptop type configuration. Even though these hand-held and sub-notebook computers are small, they provide essentially the same functionality of larger computing devices (e.g., desktop PC's). For instance, handheld and sub-notebook computers run productivity software including word processors, spreadsheets, fax, e-mail, photo editing programs, etc., and can communicate and replicate information with other computers using wireless or wired connections. Because of the rapid advancement of computer technology, the capabilities of these smaller computers are constantly increasing. However, there are problems associated with these smaller computers that have been hindering their effectiveness in spite of increasing processing power and an expanding selection of productivity software.

First, regardless of the capability of the hardware and the availability of software for these small computers, their functionality is constrained because they implement mouse devices that are either too voluminous to carry around or too small to use effectively and comfortably. In order to use the available productivity software, full mouse device functionality is essential. Therefore, in response, manufacturers of have provided touchscreen functionality on their small computers, likened to a pencil device provided to operate in conjunction with personal digital assistant devices (PDA's). Typically, use of this touchscreen system means that the functional area in which the pointer is used is limited, and the information to be processed on the screen is limited or becomes closely spaced, which is inconvenient for the user. These restrictions are a bottleneck and pose a significant barrier to attaining the potential functionality for handhelds and sub-notebooks that manufacturers are trying to provide and that consumers want. As miniaturization increases and processors continue to improve, ease of input and effective display area will be increasingly critical factors constraining the use and functionality of handheld and sub-notebook computer devices.

There have been varying efforts to address these problems. For instance, one solution in the art for inputting characters to small computing devices include the use of a virtual reality glove which incorporates an RF transmitter for wireless input. For instance, as described at http://bsac.eecs.berkeley.edu/~shollar/fingeracc/fingeracc.html, an acceleration sensing glove equipped with accelerometers placed at each finger may be used to interpret hand/finger gestures representing characters or symbols that may be interpreted by a computer and generate signals for wireless transmission to a computing device. While a viable solution, it requires the user to be fitted with the glove and the user still has a physical apparatus to carry, whilst efforts in computer minimization are aimed at increasing ease of use by limiting the volume and amount of devices required for operational use of the systems.

Furthermore, prior art W.I.P.O. Patent Disclosure Nos. 0193182 and 0193006 each disclose non-physical data input apparatuses, particularly those including a functional keyboard system. However, these do not address the problem of implementing a mouse system, using the same apparatus. That is, these references do not address problems which may occur when the user is using the keyboard and mouse system simultaneously. Furthermore, when using common software applications, the keyboard solution presented requires a different system than a mouse solution, as the required resolution to detect a keystroke is lower than the required resolution to detect mouse movement and positioning. Additionally, the displayed image is not used to assist the user in his efforts to precisely position the mouse, as it will display customizable representations of a keyboard or keypad, rigidly positioned in front of the user. Moreover, as these solutions are especially beneficial in usage with hand-held computers, the amount of energy needed for its operation is essential, for which energy saving options when using the mouse system are not described.

Thus, there is a need in the art for a mouse and pointer system which operates in combination with a keyboard system for handheld and sub-notebook computers, providing the effectiveness and comfort of physical mouse and pointer systems without significantly affecting the size or weight of the computer.

SUMMARY OF THE INVENTION

It is therefore an object of the present invention to provide for handheld computing devices, a system and method for a customizable mouse enabling user input by detecting the position of an object in front of the device by means of electromagnetic, optical or acoustic signals.

A further object of the present invention is to provide for handheld computing devices, a system and method for projecting a customizable keypad capable of following movement of an object which is used as data input object.

It is another object of the present invention to provide for handheld computing devices, a system and method for simultaneously using multiple virtual data input devices, like keyboard and mouse, in overlapping sections in which the position of the object by which the user provides data input is detected by means of electromagnetic, optical or acoustic signals.

Thus, according to one aspect of the invention, there is provided a mouse system comprising: customization according to user preferences; simultaneous usage of multiple data input devices; and customizable keypad following hand movement.

According to the principles of the invention, there is provided a system and method for handheld computer devices to display active areas of the computer screen on the surface on which the user provides data input by means of a mouse system. Preferably, there is only one virtual image displayed, which is a combination of two images which exist within the computing system, (1) the active part of the screen display, e.g., an active window or frame; and, (2) a key pad. These images are combined in the computing system itself, and displayed using as a virtual image on a surface in front of the computing device by a projection system. A detection system is included for tracking object interactivity, e.g., a user's finger, with the virtual keypad image for providing data input to the handheld computer device.

Thus, a further object is to provide for handheld computing devices, a system and method for data input by means of a user's hand/finger gestures.

According to another aspect of the invention, there is provided a mouse system comprising: displaying of active screen areas, e.g., a current application executing on the computer device, on a flat surface enabling user input; and detecting hand/finger gestures as data input via the projected key pad image. Thus, the invention provides the ability to include function buttons on the projected key pad. That is, a preferred aspect of the invention is to retain the function keys on the projected key pad as long as the application that corresponds to the function keys is active on the screen.

The system and method of the present invention provides the following advantages: 1) as the projected keyboard is non-physical, it does not have to be moved when moving the computing device; 2) changing the mouse graphics is relatively easy and one device will support multiple mouse standards, as well as for disabled users, and other uses of the mouse, like providing multiple keys on the mouse; 3) multiple devices can be used at the same time in overlapping areas in which detection of objects providing data input takes place; 4) providing instructions like 'drag and drop' becomes more natural by detection of hand/finger gestures; 5) usability is increased by selecting active parts of the screen to display on the area where data input takes place by means of the mouse system; 6) energy is saved by providing the option to turn off the displayed image on the surface when the mouse system is in use; and, 8) the user of the computing device does not have to carry a relatively large mouse in addition to that user's computing device. The present invention additionally may be implemented in computing devices such as GSM, PDA, Notebook, GPS, etc.

BRIEF DESCRIPTION OF THE DRAWINGS

Further features, aspects and advantages of the apparatus and methods of the present invention will become better understood with regard to the following description, appended claims, and the accompanying drawings where:

DETAILED DESCRIPTION OF PREFERRED EMBODIMENTS

The present invention relates generally to a handheld computing device, enabled with a projector and location sensor for data input, for example, in accordance with the teachings of herein incorporated commonly-owned, co-pending U.S. patent application Ser. No. 10/045,484 entitled USER INPUT METHOD AND APPARATUS FOR HANDHELD COMPUTERS. More particularly, the invention relates to virtual user input devices, such as, in one embodiment: (1) a mouse controlled by a physical object (e.g., a user finger or pencil) within a location sensor detection range or, in another embodiment: (2) a key pad with three or more function buttons and/or pull down menu's, which are controlled by an object within the detection range. Providing added value to the user, the virtual user input devices are combined/supported in another embodiment with a projection of the computer screen, which might be a part of the screen (e.g., an active area) for energy saving purposes.

Figure 1A:
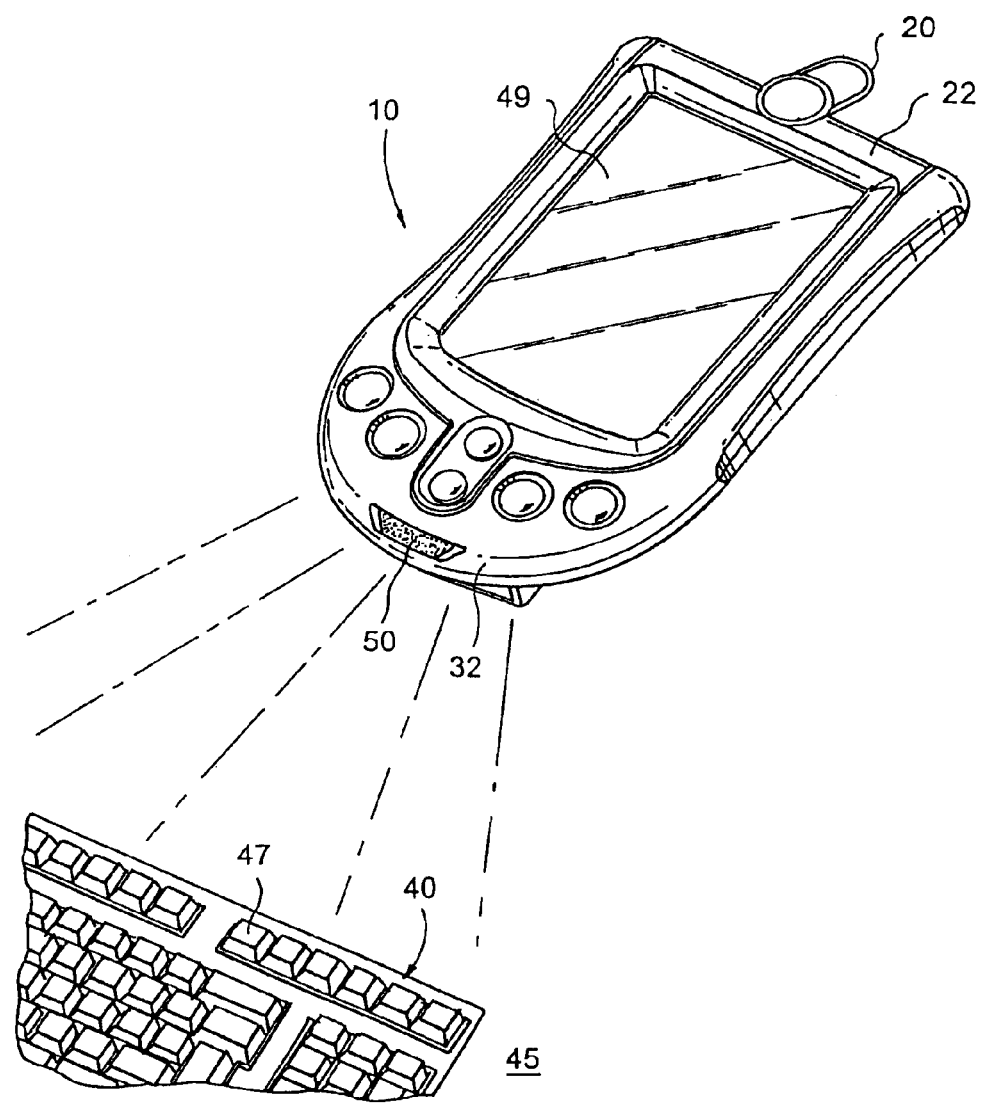
FIG. 1(a) illustrates a handheld computing device with a keyboard-projecting device displaying a keyboard and a device implementing electromagnetic signals for detecting the location of objects within a field surrounding the handheld computer.

FIG. 1(a) particularly illustrates a handheld computing device implementing a projecting device for displaying a keyboard, and a sensing device for detecting the location of objects within a field surrounding the handheld computer. Generally, the computing device includes a projector device functioning to project an image of the keyboard on, for instance, the platform or table supporting the computer device, and a location sensor device for detecting the current location of the user's finger in the area registered above the location of the pressed key in the system. Particularly, as described in U.S. patent application Ser. No. 10/045,484, a handheld computing device 10 includes a projecting device 20 that is enabled to display an optical image or graphical representation 40 of a keyboard (hereinafter "virtual" keyboard) and define a virtual keyboard space including locations 47 representing the keys and associated functionality of a conventional keyboard device; and, a radar device 50 capable of detecting the location of objects Within a field surrounding the handheld computer 10. As shown in FIG. 1(a), the projecting device 20 is suitably mounted at a top portion 22 of the computing device 10 and includes suitable electronics for converting an electronic representation of the keyboard to the virtual image representation 40.

Figure 1B:
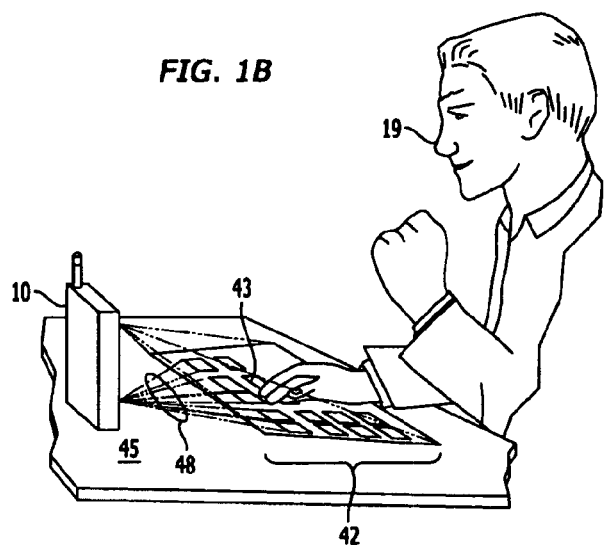
FIG. 1(b) depicts a user providing input to the handheld computing device enabled with a virtual screen display and the cooperative mouse system of the present invention.
Figure 2:
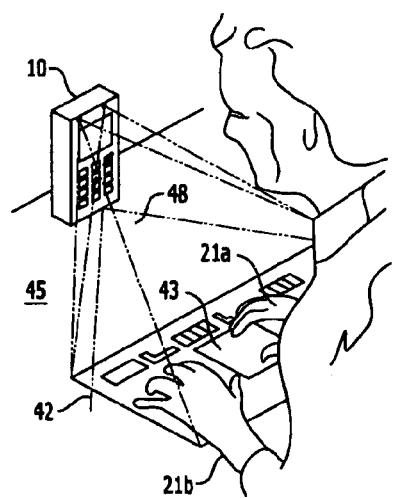
FIG. 2 illustrates the situation in which this user provides input to the handheld computing device using two objects within the detection area, of which the object on the right is considered to be an object controlling a virtual mouse for movement within a second projected area overlapping a detection area in which the virtual keyboard/keypad is defined.

Preferably, the image of the keyboard is either stored as a graphical image or constructed based on the field definitions of the user. As the key definitions are implemented in software, changing the keyboard graphics is relatively easy and one device will support multiple keyboard and keypad types as well as provide for other usages of the keyboard. Preferably, the virtual keyboard image 40 may be displayed on a pre-defined area of a table, flat screen, or supporting apparatus 45 in front of the computing device 10, for example, where a physical keyboard may be located. Additionally, the scale of the virtual keyboard image may be defined by the user, as the only constraint is the range of the radar or like detection device and the resolution in which reflected signals in the virtual keyboard space may be detected. However, the standard size may be the size of a conventional keyboard. It is understood that, the teachings herein described are readily applied for generating an actual screen display or, selected parts thereof, for example, on the area where data input takes place by means of the mouse system to present a "virtual" screen display. For instance, as shown in FIG. 2, an optical image representation 43 of an active window, e.g., corresponding to an actual on-screen display or window, may be "virtually" displayed on the pre-defined surface, such as an area of a table, desk or other flat supporting apparatus 45 in front of the computing device 10, or, as shown in FIG. 1(b), may be projected above and overlapped relation with the detection area 48 corresponding to the location of the virtual keyboard 42. FIG. 1(b) depicts a user 19 providing input to the handheld computing device enabled with a virtual screen display 43 and the cooperative mouse system of the present invention. The steps for determining the active screen area 43 to display on the surface in front of the computing device to assist the user in positioning of the mouse object are described in greater detail herein with respect to FIG. 4.

As further shown in FIG. 1(a) and in FIG. 2, the radar or like detecting device 50 is positioned, for example, at an opposite end 32 of the device beneath the screen display portion 49 of the computing device, and includes a transmit antenna, or like device, for emitting electromagnetic, RF, laser, optical or like signals used for sensing objects within a predetermined range corresponding to the surface area defined by the projected graphical representation of the keyboard, keypad or active screen image 42, and includes a receive antenna, or like receiver device for detecting objects in the restricted range. It should be understood that the radar device does not necessarily have to be placed at an opposite end of the computing device. In one embodiment, the sensing device is located above the flat surface upon which an image is projected to enable sensing of objects a predetermined distance, e.g., approximately 0.5 inches, above the virtual keyboard, keypad and/or active screen display image. In one embodiment, the transmitted signal is a radar signal, comprising radio waves sent out by the transmit antenna, however, it is understood that the signal may comprise infrared, optical or other electromagnetic signals as known to skilled artisans. The radar may send out these radio signals in different directions in accordance with a timing signal that triggers the sending of the signal. All these directions are covered within a set time, resulting in multiple sweeps per unit time, i.e., a sweep frequency. Typically, this sweep frequency is dependent on the required resolution and the sweep area in which objects above the virtual keyboard need to be detected. As the keyboard is close to the transmitting antenna, and electromagnetic waves travel at the speed of light, the time required to detect objects in one direction is short, and enables for many sweeps and a high resolution.

In accordance with herein-incorporated commonly-owned, co-pending U.S. patent application Ser. No. 10/045,484, the projected keyboard system of the present invention performs a sequence of events including: an initialization step for enabling the projector to display the graphical keyboard image in a manner suitable for the intended user; a step for positioning the radar or like detection device to generate a sweep range restricted by the dimensions of the projected keyboard image; then, after positioning the radar device to thereby restrict its sweep range, generating radar transmit timing signal pulses and a corresponding sequence of electromagnetic signals (which may comprise a 100 picosecond pulse to a resistively loaded, cavity backed, monopole antenna, for example) for transmission via the transmit antenna. The electromagnetic pulses generated by the radar transmit antenna device are configured to echo off an object or target within the field of the sensor 50 and are received by the receive antenna device. As a further step, a determination is made as to whether the radar echo is received or timed out. If an echo signal is not received, the process proceeds to determine whether an end signal has been received (time out) indicating end of the current user section. If the end signal has been received, the process ends. However, if the end signal is not received, then the process will repeat for the next radar sweep. If it is determined that the radar echo was received, then the process proceeds to calculate the object's position. In the preferred embodiment, the elapsed time between transmission of the signal and receipt of the corresponding echo is used to measure the distance to the object, hereinafter referred to as a distance "z", and provides details on the location of the object on the keyboard. As will be explained in greater detail, the distance "z" is determined as the time elapsed between transmission and receipt of the radar echo multiplied by ½ the radar speed (i.e., z=time*(speed of radar/2)). A detected keystroke on the defined key at the identified location is finally registered by the computer system. In one embodiment, the user is notified of a keyboard or keypad being pressed by a change in color or dimension of a virtual key 47 (e.g., as shown FIG. 1).

With respect to the present invention, FIG. 2 depicts a scenario in which a user 19 provides input to the handheld computing device 10 using two objects within the detection area, e.g., the user's hands 21a, 21b of which the object (hand) 21b on the right is considered to be an object controlling a virtual "mouse" device with an active area 43 overlapping the detection area in which the virtual keyboard 42 is defined. It is area 43 where a virtual image of an active screen or window is projected via the handheld computer device 10, and, as shown in FIG. 2, comprises a projected image physically located above the 'keyboard' 42.

To display the active parts of the handheld device's display screen on a surface where user input through the mouse system takes place, active parts of the screen display have to first be selected. For this selection two methods to select the active area are considered: (1) the active window in the screen, as identified by the operating system on the computer; or, (2) the area on the computer accessed during a predetermined period of time. Displaying a screen on a surface in front of the computer costs energy. By restricting the area to be displayed to the area which is actually being used, energy is saved, improving user satisfaction. The algorithm to do so is straightforward. As described herein, there are mainly two options: either selecting an active window on the screen (in case the active window, which may be a user's e-mail system, for example, takes less space than your entire screen), or, determine the area by tracking the user's movements over a period of time (e.g., if a user starts right on top of the screen and moves to the middle of the screen, the system would display only the area on the top of your screen, using borders set on a user-determined space outside of the points on the screen accessed in the near history.

Figure 4:
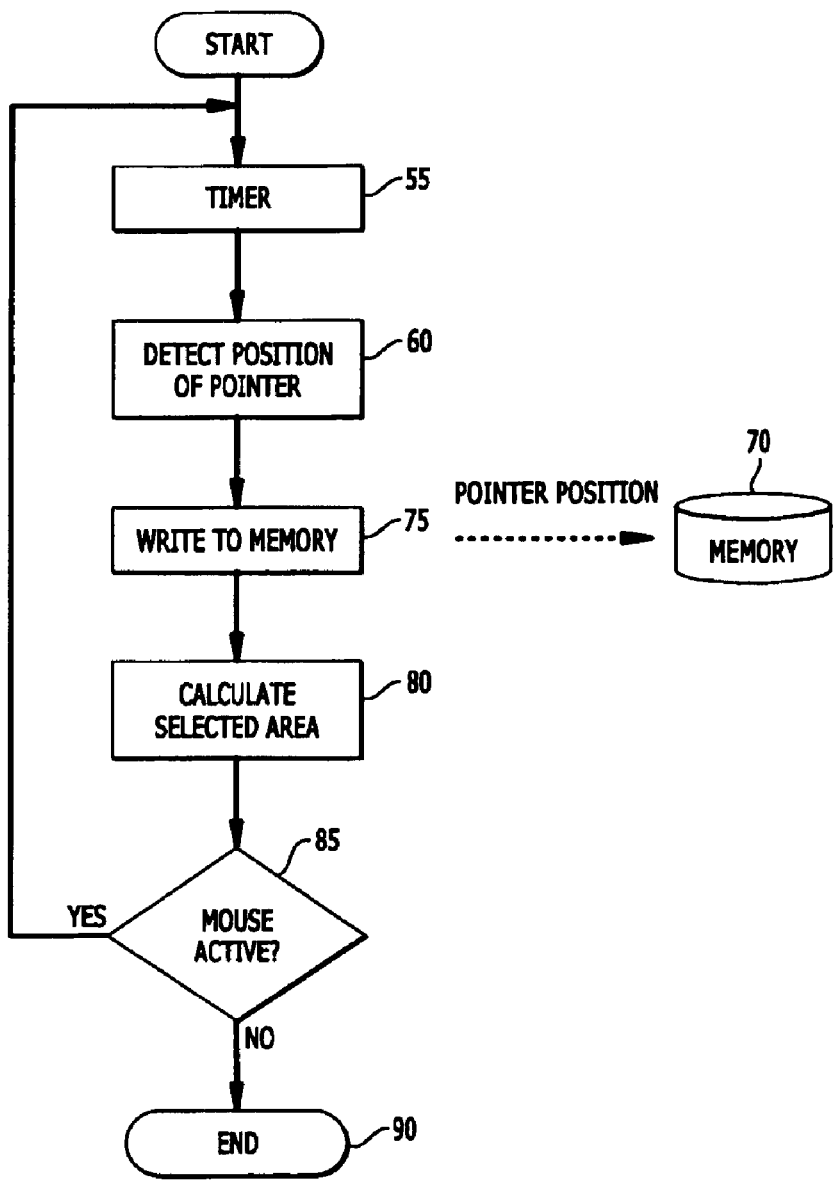
FIG. 4 is a process flowchart representing various steps to determine the second projected active screen area overlapping the detection area in which the virtual keyboard is defined to assist the user in positioning of the mouse object.

FIG. 4 is a process flowchart depicting the various steps for determining the active screen area to display on the surface in front of the computing device to assist a user in positioning of the mouse object.

Figure 3:
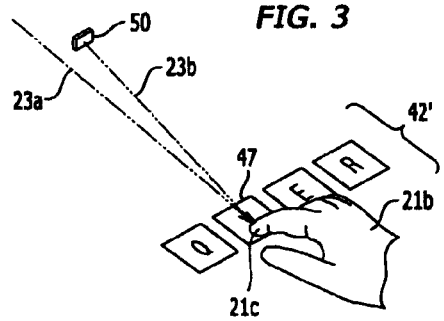
FIG. 3 illustrates the transmitted signal being reflected by the user's finger, and hence detected and positioned by the computer system.

As the user shifts from one window to another, if several windows are displayed, the entire screen is displayed, preferably, for a predetermined period of time. These periods of time, as well as the choice between active area selection methods (1) and (2), are set in the user preferences. The process, described in FIG. 4, commences when the mouse is in use and method (2) has been selected, i.e., the area on the computer is accessed during a predetermined period of time. When the mouse has not been used for a predetermined period of time, the selected area of the screen remains unchanged and switches off. Particularly, as shown at step 55 in FIG. 4, a timing mechanism is commenced for tracking usage of the mouse pointer device, i.e., an object such as a user finger, pencil or like object in the virtual screen detection area 48 of FIG. 2. Then, a position of the pointer is detected in the manner as described herein as indicated at step 60 and the pointer position is written to a memory 70 associated with the handheld computing device 10 as indicated at step 75. FIG. 3 depicts for example, a transmitted signal 23a being reflected as signal 23b off of an object, e.g., a user's hand 21b and finger 21c, for detection and commensurate registry of the user selection of a keypad 47. This detection and positioning by the computer system is as described in commonly-owned, co-pending U.S. patent application Ser. No. 10/045,484. Returning to FIG. 4, at step 80, an area of the screen to be displayed is then calculated based on the detected pointer position. At step 85, a determination is then made as to whether the mouse device is active. If the mouse device is still active the process returns to step 55 to repeat the process. Otherwise, at step 90, the process terminates.

While in the present invention, there is no physical mouse device, coordinates of the input device (e.g. a pencil or user's finger) is calculated, e.g., according to a 'cartesian' coordinate system, for example, by translating (1) the elapsed time of the returned radar/laser signal, and (2) the position of the transmitting device within its sweep to cover the detection range. This translation has been described in greater detail herein and in commonly-owned, co-pending U.S. patent application Ser. No. 10/045,484. That is, the system merely registers coordinates, as in a regular computer mouse. While a solution may require an absolute coordinates as it is beneficial to use absolute coordinates for user input, as user selected areas relate to an actual area on the screen, however, a relative coordinate system may be implemented. As known, a relative coordinate system uses the moved distance of the mouse from its position on a time t(0) towards a time t(x). Within this system, it would mean the cursor is displayed somewhere on the computer screen and once the user places a pointer object (e.g. a pencil of finger) within the detected mouse area, the current position of the cursor on the screen is set equal to the position of the pointer object. Every move of the pointer object from that position, results in a cursor movement. Preferably, if a combination of a keyboard and mouse system is active, according to the invention, a user is able to set in his/her personal preferences, preference for absolute or relative coordinates of the mouse system.

A key pad, according to the invention, is a small keyboard, which is actually designed to be used as a conventional mouse. That is, according to one aspect of the invention, the mouse is the projection of a virtual keypad, with buttons, providing mouse cursor movement and functionality (including, but not limited to cursor movement, navigation, data input, etc.) for an application running in a computer system, which in another embodiment is supported by a projection of the screen area (like the active area that the user is currently working in) on the area in which the virtual keypad is located. Thus, the key pad is defined as dynamic, having the option to flow around the surface in front of the computing device, without interfering with the active means of user input, hence providing more user friendly options to the user.

Figure 5A:
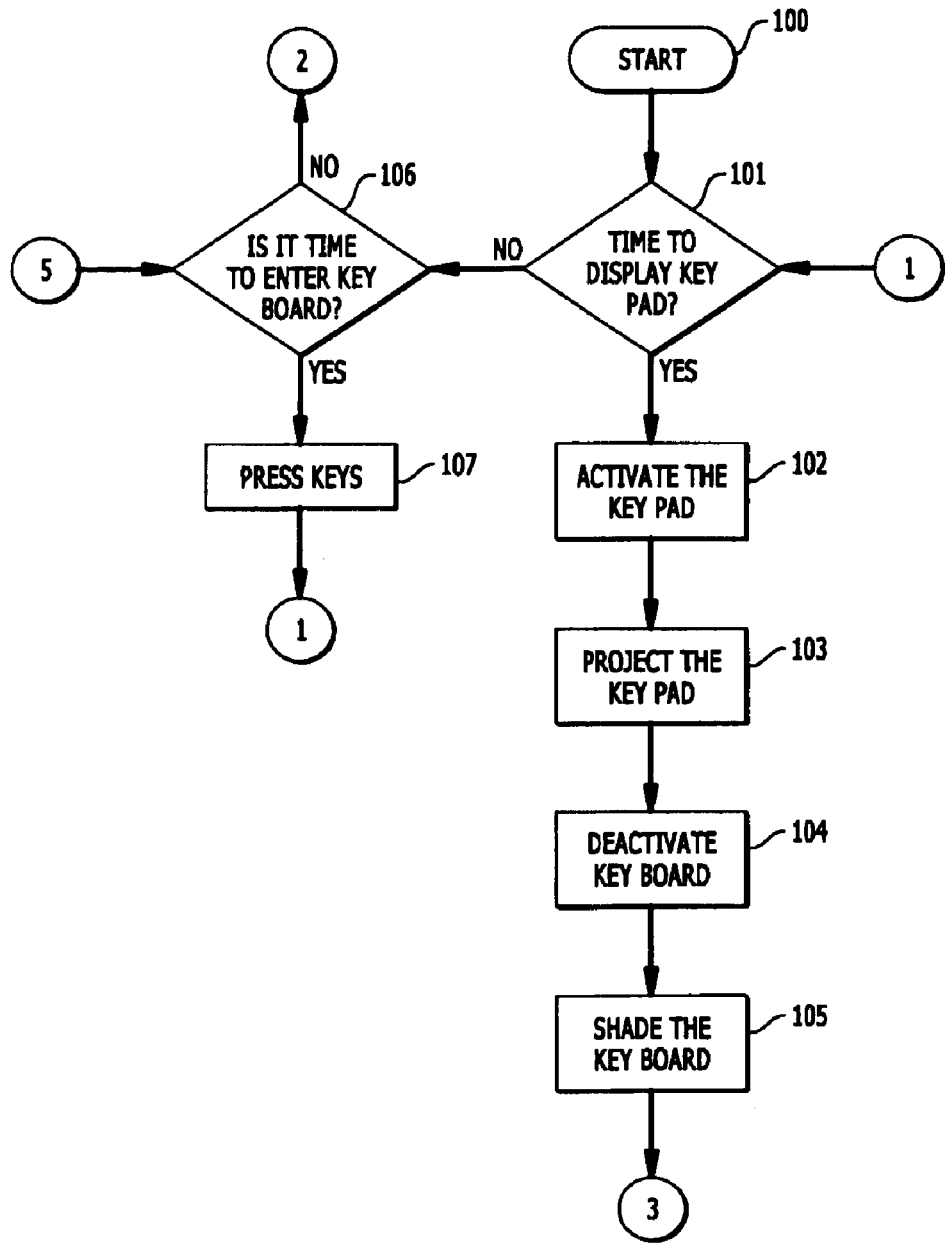
FIGS. 5(a) and 5(b) is a flow chart depicting the process for overlapping virtual key pad and virtual keyboard functionality according to the present invention.
Figure 5B:
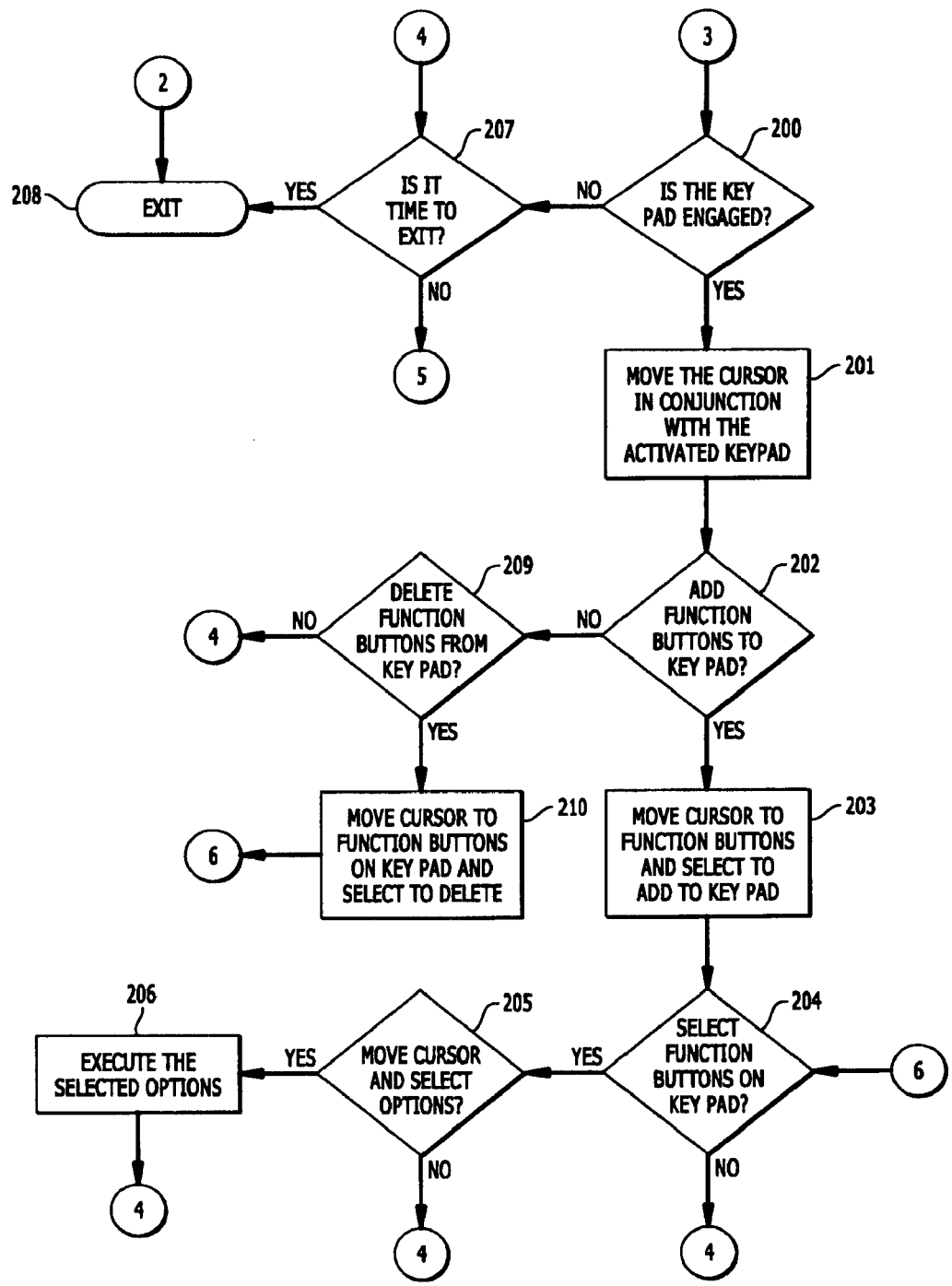
Figure 6A:
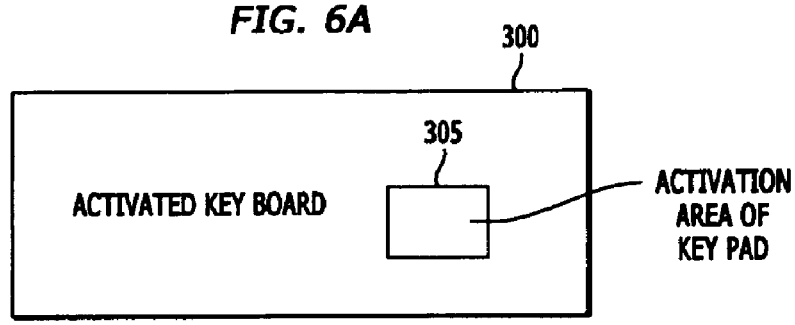
FIG. 6(a) depicts activation of the virtual key pad overlapped with an activated virtual keyboard.
Figure 6B:
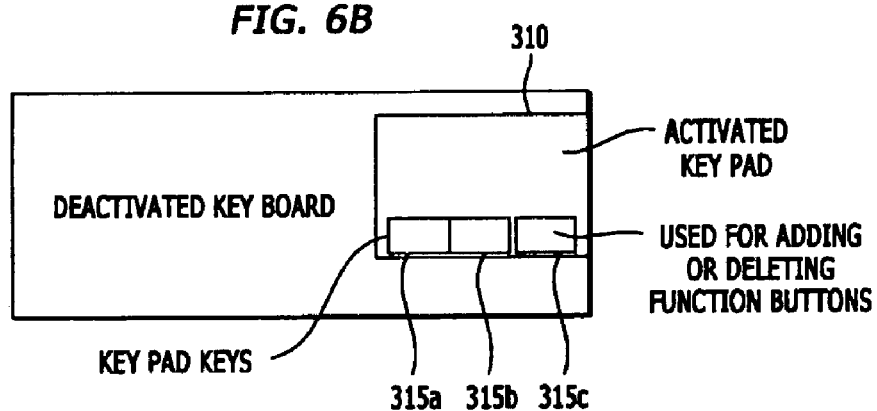
FIG. 6(b) depicts the activated virtual key pad and any added or deleted function buttons projected over an area of the projected key board that has been deactivated.
Figure 6C:
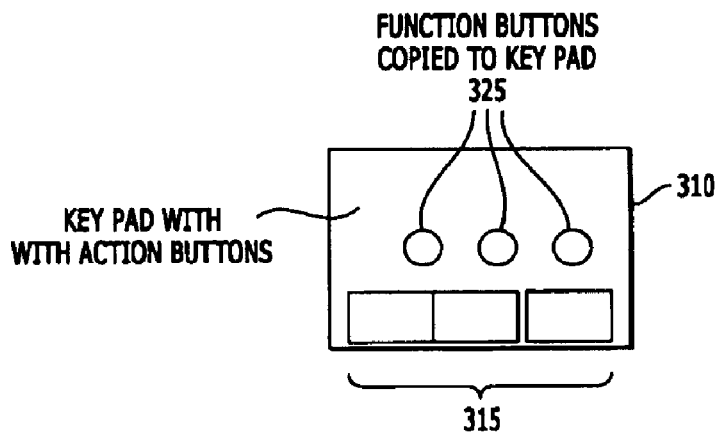
FIG. 6(c) depicts the addition of function keys added to the projected key pad.

FIGS. 5(a) and 5(b) illustrate a flow process describing the key pad overlap functions. Particularly, in view of FIG. 5(a), a first step 100 is depicted to start the process. Then, as indicated at step 101, a determination is made as to whether it is time to display the key pad over a section of the keyboard. If it is time to display the keypad over a section of the keyboard, then at step 102 the key pad is activated for virtual display. This is indicated in FIG. 6(a) with an activated keyboard 300 showing a key pad activation area 305. By touching a section of the projected keyboard with a finger or pointing device such as a pencil or like device, the projected key pad may be activated through a series of steps. For instance, as indicated at step 103, FIG. 5(a), the key pad is projected over an area of the projected key board 300. The activated key pad 310 having keys 315 is shown in FIG. 6(b). At this step, a key function file is accessed and checked to determine if any previously defined function keys exist. If so, the function buttons 325 are added to the key pad to be projected as illustrated in FIG. 6(c). Continuing in FIG. 5(a), at step 104, the key board 300 is deactivated and rendered inoperable. Finally, at step 105, the keyboard is shaded to a color or is muted, so that the projected keyboard is indicated as inoperable as in FIG. 6(b). The dotted lines in FIG. 6(b) represent the different shading of the light that is projected for the virtual keyboard 300.

Returning to step 101 in FIG. 5(a), if it is not time to display the keypad over a section of the keyboard, then the process proceeds to step 106 to determine whether it is time to enter data via the projected key board. That is, a determination is made as to whether the user has made the choice to enter data using the projected keyboard. If the user has made the choice to enter data using the projected keyboard, then the process proceeds to step 107 to continue to press keys which is the normal process for entering data into the computer using the keyboard and having the computer process the inputted data. The process then returns to step 101 FIG. 5(a) to wait until it is time to display the key pad. If, at step 107 it is determined that the user has not chosen to enter data using the projected keyboard, then the process proceeds to step 208, FIG. 5(b) where the process exits. Otherwise, after the key pad is activated and the key board deactivated the process proceeds to step 200, FIG. 5(b), where a determination is made as to whether the key pad is engaged. That is, after activating the key pad, step 200 determines whether a decision been made by the user to use the key pad to manipulate the cursor on the screen. If the user has made the decision to use the key pad to manipulate the cursor on the screen, then the cursor is moved in conjunction with the activated key pad as indicated at step 201. That is, at step 201, the key pad comprises a moving part of a keyboard. The key pad will follow the position of, e.g., the user's hand, like a mouse. An important additional function however, is provided in the key pad having buttons and pull down menu's. The system displays the key pad, its buttons and pull down menu's, in front of the computer, using the same projecting device. As the user moves his hand, for instance, in which he is using the key pad, the image of the key pad will move around in the area in front of the computing device, following the user's hand and constitutes feedback to the user, to confirm that his movements/instructions are well received by the system. This means that the projected overlapped key pad is being used with all of the functions of the traditional key pad as in FIG. 6(b) which depicts the key pad keys which are part of the projected key pad. Continuing to step 202, a determination is made as to whether additional function buttons are to be added to the virtual key pad. Function buttons are found on application screens and if selected execute functions important to the application. An example is the "File" button found on many applications. Thus, the invention provides the ability to include function buttons on the projected key pad. If additional function buttons are to be added to the key pad, then the process proceeds to step 203 which functions to move the cursor to function button and select to add to key pad. The cursor is moved to a function button on the application and selected by pressing one of the key pad keys as shown in FIG. 6(b). In the example depicted in FIG. 6(b), three (3) key pad keys 315a, 315b, and 315c are illustrated. One key 315a may be designated as a key for adding or deleting function keys to the key pad when selected. The invention thus provides for a plurality of key pad keys which includes the standard two keys found on many key pads and additional key pad keys for specific functions such as adding or deleting function buttons on the key pad. A feature of the invention is to retain the function keys on the projected key pad as long as the application that corresponds to the function keys is active on the screen. When the application is in an inactive window or the window containing the application is closed, the function keys disappear from the key pad. When the window is reactivated, the function keys reappear on the key pad. This is accomplished by storing the function key information in the key function file that identifies the application name and the function key executable together with any parameters necessary to execute the function key application. The key function file is located in a typical software application, being loaded into memory either at the start of the operating system or, only when needed, dependent on user preferences. Types of defined function keys may include user defined macro's and, standard system functions. An additional function of the keypad is that these functions are menu-driven, i.e., when a user selects a function by pressing a button on the keypad, he/she is prompted with further options if defined in the setup of the key pad.

Figure 6D:
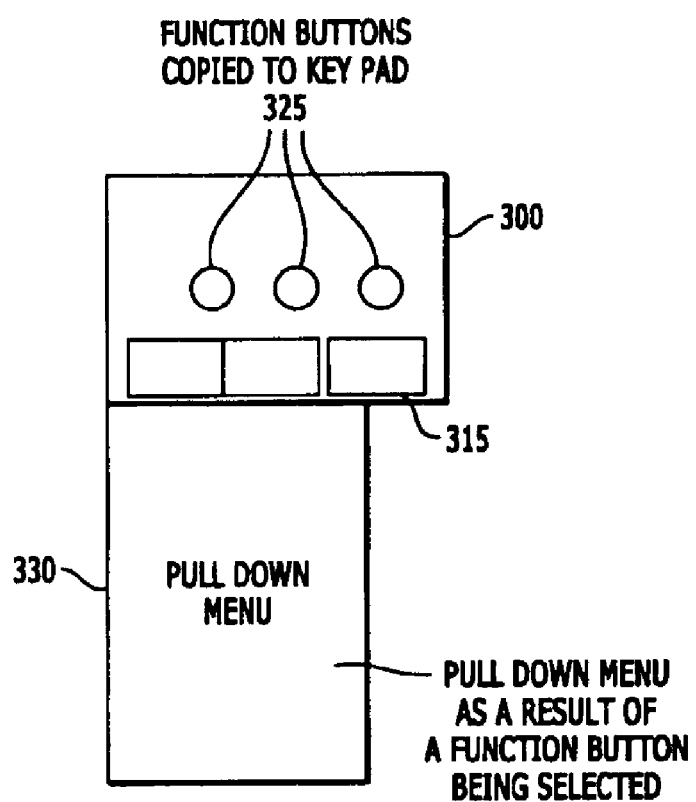
FIG. 6(d) depicts the generation and presentation of a pull down menu as a result of a virtual key pad function button being selected.

Continuing to step 204, a determination is then made as to whether any function buttons on key pad have been selected. If it is determined that a function button on key pad have been selected, then a determination is made at step 205 as to whether a pointer device, e.g., user's finger or pencil, has been moved to select options. As described herein, this may be accomplished by lifting a finger or pointer that is in contact with the key pad and pressing the function key. The timing is important, however, because a short duration from the time the finger or pointer is in contact with the key pad and pressing the function key is the indicator that the function key has been pressed. If there is a longer duration, this indicates the intention to deactivate the key pad and the key pad disappears from the projected key board. The time duration is set in the time duration file as a user preference. If at step 205 it is determined that a pointer device has been moved to select options, then at step 206 those selected options are executed. For example, as depicted in the example provided in FIG. 6(d), if the "File" function button had been selected, a pull down menu 330 may be displayed under the keypad. By additionally moving the pointer to the desired function, e.g., a "print" function, then moving the pointer for a short duration would cause the "print" function to be executed. It is understood that the pull-down menu may be displayed in any region of the active keypad display relative to the displayed function key of the keypad, as long as the menu choices are visible. The location and layout of the displayed keypad image is user selectable and may be stored in a file as a user preference.

Returning back to FIG. 5(b), at step 202, if it is determined that additional function buttons are not to be added to the virtual key pad, then the process proceeds to step 209 where a determination is made as to whether any function button(s) from the key pad are to be deleted. If any function button(s) from the key pad are to be deleted, then as indicated at step 210, a user may move a cursor to function buttons on the virtual key pad and delete that function button. That is, the cursor is moved to a function button on the key pad and selected for deletion by pressing the indicated key pad keys as in FIG. 6(b). In one embodiment, pressing the indicated key pad key twice in rapid succession, for example, with a short delay from the time the finger pointer (or object) is lifted from the key pad to the time the finger or pointer is touched on the indicated key pad key, will signal the requested action. Placing the finger or pointer (or object) back on the key pad within the duration indicated on the time duration file will cause the key pad to remain activated. After deleting the key pad, the process proceeds to step 204 as illustrated in FIG. 5(b).

Returning to step 200, if it determined that the key pad has not been engaged, or if at step 205 it is determined that a pointer device has not been moved to select options, or, if a selected function from the key pad has been executed at step 206, or if key pad functions from the key pad have not been deleted at step 209, then the process proceeds to step 207 where a determination is made as to whether it is time to exit the process. If it is not time to exit the process, then the process returns to step 106, FIG. 5(a) to determine whether it is time to enter the key board. Otherwise, the process is terminated and exits as indicated at step 208.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

What is claimed is:

1. A user input system for a computer device comprising:
a projecting device for projecting images for display on a surface in front of a user located proximate said device, a projected image including an active screen display corresponding to an application executing in said device, another projected image including an object image located within the active screen display and representing means for pointing to locations within said projected active screen display;
a signal detection system for detecting the presence of an object located at said surface in front of a user located and within a projected image display area; and,
mechanism for converting detected movement of said object located within a projected image display area on said surface into movement of said object image within said projected active screen display to facilitate data input functions at locations in said active screen display for said executing application, wherein a projected image for display on a surface further includes a dynamic keypad image having function keys for executing functions, said converting mechanism further converting detected movement of said object located within a projected image display area for dynamically moving said projected keypad image and keys on said surface in accordance with said object movement.

2. The user input system for a computer device according to claim 1, wherein said signal detection system is capable of detecting objects at locations within a limited range defined by said projected image.

3. The user input system for a computer device according to claim 2, wherein said signal detection system includes an electromagnetic signal transmitter means for iteratively transmitting series of electromagnetic signals sweeping said limited range, and receiving electromagnetic signal reflections from detected objects, wherein said electromagnetic signal transmitter means is located a predetermined distance away from said graphical representation.

4. The user input system for a computer device according to claim 1, wherein said object located at said surface in front of a user includes a finger of a user of said computer device.

5. The user input system for a computer device according to claim 1, further comprising means for selecting the active screen display of an executing application for projection on said surface.

6. The user input system for a computer device according to claim 1, wherein a projected image for display on a surface includes an image of a computer keyboard device, said signal detection system for detecting the presence of an object at locations corresponding to keys of said keyboard device.

7. The user input system for a computer device according to claim 1, further comprising means for deactivating projection of said keyboard image when projecting said keypad display.

8. The user input system for a computer device according to claim 1, wherein said dynamic keypad function keys include first and second keys, a first key representing a user-selectable function; and, a second key for initiating a prior defined function for assigning said user-selected function to a first key.

9. The user input system for a computer device according to claim 8, wherein a prior defined function includes one or more of: user macros and system functions and combinations thereof.

10. The user input system for a computer device according to claim 8, wherein a user-selected function corresponds to a function of a software application capable of being executed on said computer device, said second key automatically initiating functionality for adding one or more functions of an application to one or more first keys.

11. The user input system for a computer device according to claim 10, further including means for generating a menu having choices of further user-specified functions for projected display in response to selection of a first key.

12. The user input system for a computer device according to claim 11, further comprising means for generating and storing user preferences in a user preference file, a user preference including said menu choice functions for association with a first key.

13. The user input system for a computer device according to claim 1, further comprising means for customizing function of said keypad keys activated with said dynamic key pad image.

14. A method for inputting data in a computer device comprising:
a) projecting images generated as a result of applications executing on said computer device on a surface in front of a user located proximate said device, a projected image including an active screen display corresponding to an application executing in said device, another projected image including an object image located within the active screen display and representing means for pointing to locations within said projected active screen display;
b) detecting the presence of an object located at said surface in front of a user located and within a projected image display area; and,
c) converting detected movement of said object located within a projected image display area on said surface into movement of said object image within said projected active screen display,
d) initiating a data input function at a location in said active screen display for said executing application,
wherein a projected image for display on a surface further includes a dynamic keypad image having function keys for executing functions, said converting step further including converting detected movement of said object located within a projected image display area for dynamically moving said projected keypad image and keys on said surface in accordance with said object movement.

15. The method according to claim 14, wherein said detecting of objects includes objects located within a range defined by said projected image.

16. The method according to claim 15, wherein said detecting step b) includes the steps of:
transmitting electromagnetic signals in an iterative manner for sweeping said defined range; and,
receiving electromagnetic signal reflections from detected objects.

17. The method according to claim 15, wherein said object located at said surface in front of a user includes a finger of a user of said computer device.

18. The method according to claim 15, wherein projecting step a) includes the step of: user-selecting an active screen display of an executing application for projection on said surface.

19. The method according to claim 15, wherein a projected image for display on a surface includes an image of a computer keyboard device, said detecting including detecting the presence of an object at locations corresponding to keys of said keyboard device.

20. The method according to claim 19, further comprising the step of: deactivating projection of said keyboard image when projecting said keypad display.

21. The method according to claim 14, wherein said dynamic keypad function keys include first and second keys, said method including assigning of user-selectable functions to a first key, said assigning in response to user-selecting a second key for initiating a prior defined assigning function.

22. The method according to claim 21, wherein a prior defined function includes one or more of: user macros and system functions.

23. The method according to claim 21, wherein a prior defined function corresponds to a function of a software application capable of being executed on said computer device, said method including automatically initiating functionality for adding one or more functions of a software application to one or more first keys.

24. The method according to claim 23, further including the step of generating a menu having choices of further user-specified functions for projected display in response to selection of a first key.

25. The method according to claim 24, further including the step of generating and storing user preferences in a user preference file, a user preference including said menu choice functions associated with a first key.

26. The method according to claim 14, further comprising the step of customizing function of said keypad keys activated with said dynamic key pad image.

27. A program storage device readable by machine, tangibly embodying a program of instructions executable by the machine to perform method steps for inputting data in a computer device, the method comprising steps of:

a) projecting images generated as a result of applications executing on said computer device on a surface in front of a user located proximate said device, a projected image including an active screen display corresponding to an application executing in said device, another projected image including an object image located within the active screen display and representing means for pointing to locations within said projected active screen display;

b) detecting the presence of an object located at said surface in front of a user located and within a projected image display area; and, c) converting detected movement of said object located within a projected image display area on said surface into movement of said object image within said projected active screen display, d) initiating a data input function at a location in said active screen display for said executing application, wherein said projected image for display on a surface includes a dynamic keypad image having function keys for executing functions, said converting step further including converting detected movement of said object located within a projected image display area for dynamically moving said projected keypad image and keys on said surface in accordance with said object movement.

28. The program storage device readable by machine according to claim 27, wherein projecting step a) includes the step of: user-selecting an active screen display of an executing application for projection on said surface.

* * * * *